US011860764B2

(12) United States Patent
Peng et al.

(10) Patent No.: US 11,860,764 B2
(45) Date of Patent: Jan. 2, 2024

(54) METHOD, APPARATUS, AND SYSTEM FOR EVALUATING CODE DESIGN QUALITY

(71) Applicant: Siemens Aktiengesellschaft, Munich (DE)

(72) Inventors: Fei Peng, Beijing (CN); Ke Han, Beijing (CN)

(73) Assignee: SIEMENS AKTIENGESELLSHAFT, Munich (DE)

( * ) Notice: Subject to any disclaimer, the term of this patent is extended or adjusted under 35 U.S.C. 154(b) by 46 days.

(21) Appl. No.: 17/441,781

(22) PCT Filed: Mar. 26, 2019

(86) PCT No.: PCT/CN2019/079738
§ 371 (c)(1),
(2) Date: Sep. 22, 2021

(87) PCT Pub. No.: WO2020/191627
PCT Pub. Date: Oct. 1, 2020

(65) Prior Publication Data
US 2022/0179773 A1   Jun. 9, 2022

(51) Int. Cl.
G06F 11/36   (2006.01)

(52) U.S. Cl.
CPC ................ *G06F 11/3616* (2013.01)

(58) Field of Classification Search
None
See application file for complete search history.

(56) References Cited

U.S. PATENT DOCUMENTS 8,955,116 B2 * 2/2015 Ikeda .................. G06F 21/51
  726/25
10,782,936 B1 * 9/2020 Davis .................. G06F 8/72
(Continued)

FOREIGN PATENT DOCUMENTS

CN   103995775 A   8/2014
CN   106055483 A   10/2016
(Continued)

OTHER PUBLICATIONS

Bleisch, Tobias, "An Empirical Study of CSS Code Smells in Web Frameworks," California Polytechnic State University, San Luis Obispo, Mar. 2018, last retrieved from https://digitalcommons.calpoly.edu/cgi/viewcontent.cgi?article=3271&context=theses on Jan. 6, 2023. (Year: 2018).*

(Continued)

Primary Examiner — Andrew M. Lyons
(74) Attorney, Agent, or Firm — Harness, Dickey & Pierce, P.L.C.

(57) ABSTRACT

A method, an apparatus, and a system are for evaluating code design quality. The method for evaluating code design quality includes: determining, based upon a result from static scanning of code, a probability of the presence of an error-prone pattern in the code; inputting the probability into an artificial neural network, and determining, based upon the artificial neural network, a prediction result for whether the code violates a preset design rule and for a quantized degree to which the design rule is violated; and based upon the prediction result, evaluating the design quality of the code. The present method is able to improve the accuracy of code design quality evaluation. By detecting a presence of an error-prone pattern in the code, whether or not a key design rule has been violated in a design process and a quantized degree to which the key design rule is violated are predicted.

13 Claims, 5 Drawing Sheets

(56) References Cited

U.S. PATENT DOCUMENTS

| | | | | |
|---|---|---|---|---|
| 2013/0311968 | A1* | 11/2013 | Sharma | G06F 11/3692 717/101 |
| 2019/0220253 | A1* | 7/2019 | Pradhan | G06N 3/08 |
| 2020/0004918 | A1* | 1/2020 | Sha | G03F 7/705 |
| 2020/0089491 | A1* | 3/2020 | Sahu | G06F 8/75 |
| 2022/0327364 | A1* | 10/2022 | Hunsche | G03F 1/36 |

FOREIGN PATENT DOCUMENTS

| | | |
|---|---|---|
| CN | 108710568 A | 10/2018 |
| CN | 109408389 A | 3/2019 |

OTHER PUBLICATIONS

Guggulothu, Thirupathi, "Code Smell Detection using Multilabel Classification Approach," Feb. 8, 2019, arXiv:1902.03222v1 [cs.SE], last retrieved from https://arxiv.org/pdf/1902.03222.pdf on Jan. 6, 2023. (Year: 2019).*

W. Kessentini, M. Kessentini, H. Sahraoui, S. Bechikh and A. Ouni, "A Cooperative Parallel Search-Based Software Engineering Approach for Code-Smells Detection," in IEEE Transactions on Software Engineering, vol. 40, No. 9, pp. 841-861, Sep. 1, 2014, doi: 10.1109/TSE.2014.2331057. (Year: 2014).*

Kim, Dong Kwan. (2017). Finding Bad Code Smells with Neural Network Models. International Journal of Electrical and Computer Engineering. 7. 3613-3621. 10.11591/ijece.v7i6.pp. 3613-3621. (Year: 2017).*

T. M. Khoshgoftaar, D. L. Lanning and A. S. Pandya, "A comparative study of pattern recognition techniques for quality evaluation of telecommunications software," in IEEE Journal on Selected Areas in Communications, vol. 12, No. 2, pp. 279-291, Feb. 1994, doi: 10.1109/49.272878. (Year: 1994).*

Tushar Sharma et al: "Designite—A Software Design Quality Assessment Tool", Bringing Architectural Design Thinking Into Developers' Daily Activities, ACM, 2 Penn Plaza, Suite 701 New York NY 10121-0701 USA, May 14, 2016 (May 14, 2016), pp. 1-4, XP058258689, DOI: 10.1145/2896935.2896938.

Plosch Reinhold et al: "Measuring, Assessing and Improving Software Quality based on Object-Oriented Design Principles", Open Computer Science, vol. 6, No. 1, Dec. 29, 2016 (Dec. 29, 2016), pp. 187-207, XP055966617, DOI 10.1515/comp-2016-0016.

Palomba Fabio, et al: "Toward a Smell-Aware Bug Prediction Model", IEEE Transactions on Software Engineering, IEEE Service Center, Los Alamitos, CA, US, vol. 45, No. 2, Feb. 1, 2019 (Feb. 1, 2019), pp. 194-218, XP011709097, ISSN: 0098-5589, DOI: 10.1109/TSE.2017.2770122 [retrieved on Feb. 11, 2019].

Oizumi Willian et al: "Code Anomalies Flock Together: Exploring Code Anomaly Agglomerations for Locating Design Problems", 2016 IEEE/ACM 38th International Conference on Software Engineering (ICSE), ACM, May 14, 2016 (May 14, 2016), pp. 440-451, XP033082875.

International Search Report dated Jan. 2, 2020.

* cited by examiner

METHOD, APPARATUS, AND SYSTEM FOR EVALUATING CODE DESIGN QUALITY

PRIORITY STATEMENT

This application is the national phase under 35 U.S.C. § 371 of PCT International Application No. PCT/CN2019/079738 which has an International filing date of Mar. 26, 2019, which designated the United States of America, the entire contents of which are hereby incorporated herein by reference.

FIELD

Embodiments of the present invention generally relate to the technical field of software project development, and in particular to a method, apparatus and system for evaluating code design quality.

BACKGROUND

Software plays an important role in a variety of application environments such as modern electrical and electronic systems. Software quality plays a prominent role in the overall function, reliability and quality of the entire system. Errors in software design may exist in many different forms, and system failures caused by them may harm human life and safety, require a lot of money to repair, and result in customer dissatisfaction and damage to the company's reputation. Therefore, property software quality management capabilities are essential to the success of a business.

Code review is the process of systematically reviewing the software source code, aiming to check the design quality of the code and identify errors to correct them and improve the software quality. Effectively performing code review during software development can ensure that most software errors can be identified and corrected early in the software development phase, thereby helping to improve the overall quality of the software and achieving rapid delivery of the software without quality defects.

So far, most code reviews are done manually, for example, by informal walk-through, formal review meetings, pair programming, etc. These activities require a large amount of manpower, and also require the reviewers to be more senior or more experienced than ordinary developers. As a result, in practice, software development teams often ignore the process due to various factors (for example, time pressure, lack of suitable reviewers, etc.), or it is difficult to guarantee the quality of code review. The use of static analysis tools for automatic code review is also a common method. Based on predetermined quality inspection rules, static analysis tools can quickly scan the source code and identify patterns that are likely to cause software errors, then alert developers in the form of warnings, and provide suggestions on how to fix them. However, violating the predetermined quality inspection rules does not necessarily lead to quality defects. Therefore, static analysis tools often generate a large number of warnings, most of which are false alarms that can be ignored. It still requires a lot of manpower to analyze the results to determine which ones of them are quality defects that really need to be repaired and which ones are merely invalid warnings.

SUMMARY

The embodiments of the present invention provide a method, apparatus, and system for evaluating code design quality.

Example embodiments of the present invention are as follows:

A method of an embodiment for evaluating code design quality, comprises:
 determining the probabilities of error-prone patterns in a code based on the result of static scanning of the code;
 inputting the probabilities into an artificial neural network, and, based on the artificial neural network, determining a prediction result of whether the code violates predetermined design principles and a quantified degree to which the code violates the design principles; and
 evaluating the design quality of the code based on the prediction result.

An apparatus of an embodiment for evaluating code design quality, comprises:
 a determining module, configured to determine the probabilities of error-prone patterns in a code based on the result of static scanning of the code;
 a prediction result determining module, configured to input the probabilities into an artificial neural network, and, based on the artificial neural network, to determine a prediction result of whether the code violates predetermined design principles and a quantified degree to which the code violates the design principles; and
 an evaluation module, configured to evaluate the design quality of the code based on the prediction result.

A system of an embodiment for evaluating code design quality, comprises:
 a code repository, configured to store a code to be evaluated;
 a static scanning tool, configured to statically scan the code to be evaluated;
 an error prone pattern detector, configured to determine the probability of an error-prone pattern in the code based on the result of static scanning output by the static scanning tool; and
 an artificial neural network, configured to determine, based on the probability, a prediction result of whether the code violates a predetermined design principle and a quantified degree to which the code violates the design principle, wherein the prediction result is used to evaluate the design quality of the code.

An apparatus of an embodiment for evaluating code design quality, comprises
 a processor and a memory; wherein
 the memory stores an application that can be executed by the processor, which is used to cause the processor to execute the method of an embodiment for evaluating code design quality as described in any of the paragraphs.

A computer-readable storage medium, wherein a computer-readable instruction is stored in it, and the computer-readable instruction is used to execute the method of an embodiment for evaluating code design quality as described in any of the paragraphs.

Figure 1:
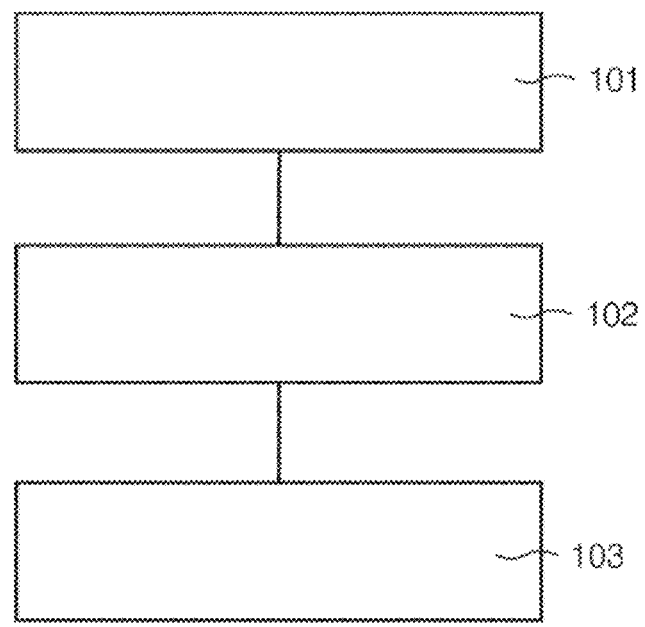
FIG. 1 is a flowchart of the method for evaluating code design quality of the embodiments of the present invention.

In the drawings, the following reference numerals are used:

| Numeral | Meaning |
| --- | --- |
| 101-103 | Steps |
| 200 | Input layer |
| 201 | Probability of an error-prone pattern |
| 202 | Hidden layer |
| 204 | Output layer |
| 400 | Softmax layer |
| 600 | Maximum probability layer |
| 601 | Minimize Upfront Design |
| 602 | Single Responsibility Principle |
| 603 | Separation of Concerns |
| 300 | Code repository |
| 301 | Code to be evaluated |
| 302 | Static scanning tool |
| 303 | Error-prone pattern detector |
| 304 | Artificial neural network |
| 305 | Prediction result |
| 400 | Apparatus for evaluating code design quality |
| 401 | Determining module |
| 402 | Prediction result determining module |
| 403 | Evaluation module |
| 500 | Apparatus for evaluating code design quality |
| 501 | Processor |
| 502 | Memory |

DETAILED DESCRIPTION OF THE EXAMPLE EMBODIMENTS

A method of an embodiment for evaluating code design quality, comprises:
  determining the probabilities of error-prone patterns in a code based on the result of static scanning of the code;
  inputting the probabilities into an artificial neural network, and, based on the artificial neural network, determining a prediction result of whether the code violates predetermined design principles and a quantified degree to which the code violates the design principles; and
  evaluating the design quality of the code based on the prediction result.

It can be seen that, through detecting error-prone patterns in a code, the embodiments of the present invention predict whether key design principles are violated and the quantified degree to which they are violated in the software design process, thereby evaluating the design quality of the code, so that the code review process is fully automated, eliminating the disadvantage of too many false alarms resulting from direct evaluation of the design quality based on quality inspection rules in the prior art and providing high evaluation accuracy.

In one embodiment, the error-prone patterns include at least one of the following: shotgun surgery; divergent change; big design up front; scattered/redundant functionality; cyclic dependency; bad dependency; complex class; long method; code duplication; long parameter list; message chain; and unused method; and/or
  the design principles include at least one of the following: Separation of Concerns; Single Responsibility Principle; Least Knowledge; Don't Repeat Yourself; and Minimize Upfront Design.

It can be seen that the embodiments of the present invention can further improve review accuracy by use of a plurality of predetermined error-prone patterns and predetermined design principles.

In one embodiment, the method further comprises: receiving a modification record of the code; and
  determining the probabilities of error-prone patterns in a code based on the result of static scanning of the code comprises: determining the probability of an error-prone pattern in the code based on a compound logic conditional expression comprising the result of static scanning and/or the modification record.

Therefore, the embodiments of the present invention can improve the accuracy in detecting error-prone patterns based on a compound logic conditional expression comprising the modification record of the code.

In one embodiment, determining the probability of an error-prone pattern in the code based on a compound logic conditional expression comprising the result of static scanning and/or the modification record comprises at least one of the following:
  determining the probability of the existence of a shotgun surgery based on a compound logic conditional expression comprising the metrics of afferent coupling, efferent coupling and changing method;
  determining the probability of the existence of a divergent change based on a compound logic conditional expression comprising the metrics of revision number, instability and afferent coupling;
  determining the probability of the existence of a big design up front based on a compound logic conditional expression comprising the metrics of line of code, line of changed code, class number, changed class number and the statistical average of the above metrics;
  determining the probability of the existence of a scattered/redundant functionality based on a compound logic conditional expression comprising the metrics of structure similarity and logic similarity;
  determining the probability of the existence of a long method based on a compound logic conditional expression comprising the metric of cyclomatic complexity;
  determining the probability of the existence of a complex class based on a compound logic conditional expression comprising the metrics of line of code, attribute number, method number and maximum method cyclomatic complexity;
  determining the probability of the existence of a long parameter list based on a compound logic conditional expression comprising the metric of parameter number; and
  determining the probability of the existence of a message chain based on a compound logic conditional expression comprising the metric of indirect calling number.

It can be seen that the embodiments of the present invention provide a detection method based on quantifiable metrics representing the attribute of the cause of different error-prone patterns, so that the error-prone patterns are detected automatically.

In one embodiment, the predetermined thresholds in the compound logic conditional expression are adjustable.

Therefore, it can be applicable to a plurality of applications through the adjustment of the predetermined thresholds in the compound logic conditional expression.

In one embodiment, the artificial neural network comprises connections between error-prone patterns and design principles, and determining, based on the artificial neural network, a prediction result of whether the code violates predetermined design principles and a quantified degree to which the code violates the design principles comprises:
  based on the connections in the artificial neural network and the probabilities of error-prone patterns, determining a prediction result of whether the code violates the design principles and a quantified degree to which the code violates the design principles.

Therefore, evaluation efficiency is ensured through automatic generation of the prediction result by use of an artificial neural network.

In one embodiment, the method further comprises:
  adjusting the weights of the connections in the artificial neural network based on a self-learning algorithm.

It can be seen that the artificial neural network becomes more and more accurate when adjusted based on a self-learning algorithm.

In one embodiment, evaluating the design quality of the code based on the prediction result comprises at least one of the following:
  evaluating the design quality of the code based on whether it violates a predetermined design principle, wherein not violating the predetermined design principle is better in the design quality than violating the predetermined design principle; and
  evaluating the design quality of the code based on the quantified degree to which it violates the design principle, wherein the quantified degree to which it violates the design principle is inversely proportional to how good the design quality is evaluated to be.

In one embodiment, the connections between error-prone patterns and design principles include at least one of the following:
  a connection between shotgun surgery and Separation of Concerns; a connection between shotgun surgery and Single Responsibility Principle; a connection between divergent change and Separation of Concerns; a connection between divergent change and Single Responsibility Principle; a connection between big design up front and Minimize Upfront Design; a connection between scattered functionality and Don't Repeat Yourself; a connection between redundant functionality and Don't Repeat Yourself; a connection between cyclic dependency and Separation of Concerns; a connection between cyclic dependency and Least Knowledge; a connection between bad dependency and Separation of Concerns; a connection between bad dependency and Least Knowledge; a connection between complex class and Single Responsibility Principle; a connection between long method and Single Responsibility Principle; a connection between code duplication and Don't Repeat Yourself; a connection between long parameter list and Single Responsibility Principle; a connection between message chain and Least Knowledge; and a connection between unused method and Minimize Upfront Design. It can be seen that the embodiments of the present invention optimize the connection form of the artificial neural network through analysis of the correspondence between error-prone patterns and design principles.

An apparatus of an embodiment for evaluating code design quality, comprises:
  a determining module, configured to determine the probabilities of error-prone patterns in a code based on the result of static scanning of the code;
  a prediction result determining module, configured to input the probabilities into an artificial neural network, and, based on the artificial neural network, to determine a prediction result of whether the code violates predetermined design principles and a quantified degree to which the code violates the design principles; and
  an evaluation module, configured to evaluate the design quality of the code based on the prediction result.

It can be seen that, through detecting error-prone patterns in a code, the embodiments of the present invention predict whether key design principles are violated in the software design process and the quantified degree to which they are violated, thereby evaluating the design quality of the code, so that the code review process is fully automated, eliminating the disadvantage of too many false alarms resulting from direct evaluation of the design quality based on quality inspection rules in the prior art and providing high evaluation accuracy.

In one embodiment, the error-prone patterns include at least one of the following: shotgun surgery; divergent change; big design up front; scattered/redundant functionality; cyclic dependency; bad dependency; complex class; long method; code duplication; long parameter list; message chain; and unused method; and/or
  the design principles include at least one of the following: Separation of Concerns; Single Responsibility Principle; Least Knowledge; Don't Repeat Yourself; and Minimize Upfront Design.

It can be seen that the embodiments of the present invention can further improve review accuracy by use of a plurality of predetermined error-prone patterns and predetermined design principles.

In one embodiment, the determining module is further configured to receive a modification record of the code, wherein determining the probabilities of error-prone patterns in a code based on the result of static scanning of the code comprises: determining the probability of an error-prone pattern in the code based on a compound logic conditional expression comprising the result of static scanning and/or the modification record.

Therefore, the embodiments of the present invention can improve the accuracy in detecting error-prone patterns based on a compound logic conditional expression comprising the modification record of the code.

In one embodiment, determining the probability of an error-prone pattern in the code based on a compound logic conditional expression comprising the result of static scanning and/or the modification record comprises at least one of the following:
  determining the probability of the existence of a shotgun surgery based on a compound logic conditional expression comprising the metrics of afferent coupling, efferent coupling and changing method;
  determining the probability of the existence of a divergent change based on a compound logic conditional expression comprising the metrics of revision number, instability and afferent coupling;
  determining the probability of the existence of a big design up front based on a compound logic conditional expression comprising the metrics of line of code, line of changed code, class number, changed class number and the statistical average of the above metrics;
  determining the probability of the existence of a scattered/redundant functionality based on a compound logic conditional expression comprising the metrics of structure similarity and logic similarity;
  determining the probability of the existence of a long method based on a compound logic conditional expression comprising the metric of cyclomatic complexity;

determining the probability of the existence of a complex class based on a compound logic conditional expression comprising the metrics of line of code, attribute number, method number and maximum method cyclomatic complexity;

determining the probability of the existence of a long parameter list based on a compound logic conditional expression comprising the metric of parameter number; and determining the probability of the existence of a message chain based on a compound logic conditional expression comprising the metric of indirect calling number.

It can be seen that the embodiments of the present invention provide a detection method based on quantifiable metrics representing the attribute of the cause of different error-prone patterns, so that the error-prone patterns are detected automatically.

In one embodiment, the artificial neural network comprises connections between error-prone patterns and design principles; and the prediction result determining module is further configured to determine, based on the connections in the artificial neural network and the probabilities of error-prone patterns, a prediction result of whether the code violates the design principles and a quantified degree to which the code violates the design principles.

Therefore, evaluation efficiency is ensured through automatic generation of the prediction result by use of an artificial neural network.

In one embodiment, the evaluation module is configured to evaluate the design quality of the code based on whether it violates a predetermined design principle, wherein not violating the predetermined design principle is better in the design quality than violating the predetermined design principle; and to evaluate the design quality of the code based on the quantified degree to which it violates the design principle, wherein the quantified degree to which it violates the design principle is inversely proportional to how good the design quality is evaluated to be.

In one embodiment, the connections between error-prone patterns and design principles include at least one of the following:

a connection between shotgun surgery and Separation of Concerns; a connection between shotgun surgery and Single Responsibility Principle; a connection between divergent change and Separation of Concerns; a connection between divergent change and Single Responsibility Principle; a connection between big design up front and Minimize Upfront Design; a connection between scattered functionality and Don't Repeat Yourself; a connection between redundant functionality and Don't Repeat Yourself; a connection between cyclic dependency and Separation of Concerns; a connection between cyclic dependency and Least Knowledge; a connection between bad dependency and Separation of Concerns; a connection between bad dependency and Least Knowledge; a connection between complex class and Single Responsibility Principle; a connection between long method and Single Responsibility Principle; a connection between code duplication and Don't Repeat Yourself; a connection between long parameter list and Single Responsibility Principle; a connection between message chain and Least Knowledge; and a connection between unused method and Minimize Upfront Design.

It can be seen that the embodiments of the present invention optimize the connection form of the artificial neural network through analysis of the correspondence between error-prone patterns and design principles.

A system of an embodiment for evaluating code design quality, comprises:

a code repository, configured to store a code to be evaluated;

a static scanning tool, configured to statically scan the code to be evaluated;

an error prone pattern detector, configured to determine the probability of an error-prone pattern in the code based on the result of static scanning output by the static scanning tool; and an artificial neural network, configured to determine, based on the probability, a prediction result of whether the code violates a predetermined design principle and a quantified degree to which the code violates the design principle, wherein the prediction result is used to evaluate the design quality of the code.

Therefore, the embodiments of the present invention detect the probability of an error-prone pattern based on the result of static scanning by a static scanning tool, predict whether key design principles are violated during the software design process and a quantified degree to which the key design principles are violated, and evaluate the design quality of the code based thereon, whereby providing the advantage of high accuracy in the evaluation and effectively preventing false alarms.

In one embodiment, the code repository is further configured to store a modification record of the code; and the static scanning tool is configured to determine the probability of an error-prone pattern in the code based on a compound logic conditional expression comprising the result of static scanning and/or the modification record.

Therefore, the embodiments of the present invention can improve the accuracy in detecting error-prone patterns based on a compound logic conditional expression comprising the modification record of the code.

An apparatus of an embodiment for evaluating code design quality, comprises a processor and a memory; wherein the memory stores an application that can be executed by the processor, which is used to cause the processor to execute the method of an embodiment for evaluating code design quality as described in any of the paragraphs.

A computer-readable storage medium, wherein a computer-readable instruction is stored in it, and the computer-readable instruction is used to execute the method of an embodiment for evaluating code design quality as described in any of the paragraphs.

The present invention is further described in detail with reference to the drawings and the embodiments, so that its technical solution and advantages become clearer. It should be understood that the specific embodiments described here are only used to illustratively explain the present invention, and are not used to limit the scope of the present invention.

In order to be concise and intuitive in the description, the solution of the present invention is described below with reference to several representative embodiments. The large amount of details in the embodiments is only used to help to understand the solution of the present invention. However, it is obvious that the technical solution of the present invention may not be limited to these details. In order to avoid unnecessarily obscuring the solution of the present invention, some embodiments are not described in detail, but only a framework is given. Hereinafter, "including" means "including but not limited to", and "according to . . . " means "at least according to . . . , but not limited to . . . ". Due to Chinese language habits, when the quantity of an element is not specified hereinafter, it means that there may be one or several of the elements, or it can be understood as there is at least one of it.

In the embodiments of the present invention, the result of static scanning of a code and/or the modification record (comprising the history of addition/deletion/change/revision) of the code may be used to estimate whether key software design principles of the reviewed source code are followed in the development process and how well they are implemented. It is based on an obvious reason: if a key design principle is fully considered in the design process, the possibility of identifying related error-prone patterns arising from violating the principle in the source code will be reduced as a result. Therefore, by detecting whether there are related error-prone patterns in the source code, it can be estimated to what extent the software has followed the key design principle during the design process, thereby the design quality of the code can be evaluated and the areas for quality improvement can be determined.

FIG. 1 is the method for evaluating code design quality of the embodiments of the present invention.

As shown in FIG. 1, the method comprises:

Step 101: determining the probability of an error-prone pattern in a code based on the result of static scanning of the code.

Here, static scanning of a code refers to the code analysis technique whereby a program code is scanned through lexical analysis, syntactic analysis, control flow and data flow analysis and other techniques without running the code, to verify whether the code meets the indicators including the specifications, security, reliability, maintainability, etc.

For example, static code scanning tools may include: Understand, Checkstyle, FindBugs, PMD, Fortify SCA, Checkmarx, CodeSecure, etc. And static scanning results may include: code metrics, quality defect warnings and related findings, etc. Wherein, code metrics may include: maintainability index, cyclomatic complexity, depth of inheritance, class coupling, line of code, etc.

Here, error-prone patterns are usually also called bad code smells, which are diagnostic symptoms that indicate the software design may have quality issues. Error-prone patterns may exist in source code units at different levels.

For example, error-prone patterns may include at least one of the following: shotgun surgery, divergent change, big design up front (BDUF), scattered functionality, redundant functionality, cyclic dependency, bad dependency, complex class, long method, code duplication, long parameter list, message chain, unused method, etc.

Wherein, divergent change means that a class is always passively modified repeatedly for different reasons. Shot modification is similar to divergent change and means that, whenever a class needs some kind of change, many small modifications must be made in many other different classes accordingly, i.e., shotgun modifications. Big design up front means a large amount of design in advance in the early stages of the project, especially when the requirements are incomplete or unclear. Scattered functionality and redundant functionality mean that the same function/high-level concern is repeatedly implemented by a plurality of methods. Cyclic dependency means that two or more classes/modules/architecture components have direct or indirect dependencies on each other. Bad dependency means that a class/module needs to use information of other classes/modules that should not be closely related to it. Complex class means that a class is too complex. Long method means there are too many logic branches in a method. Code duplication means that the same code structure repeatedly appears at different locations in the software. It mainly includes: two functions in the same class have the same expression; two brother subclasses have the same expression in them; two completely unrelated classes have the same expression, etc. Long parameter list means that a method requires too many parameters. Message chain means that a class/method uses a method or attribute of a class that is not its direct friend. Unused method means a method that will never be used/called in the code.

For example, Table 1 is an example description of the error-prone patterns of C++ source code.

TABLE 1

| Error-prone pattern | Description |
| --- | --- |
| Shotgun surgery | Several other classes/modules must be modified in order to make a small change to a class/module. |
| Divergent change | A class/module is frequently changed in different ways and for different reasons. |
| Big design up front (BDUF) | Large-scale pre-design is done too early, for example, when the requirements are still unclear or incomplete. |
| Scattered/redundant functionality | A plurality of methods repeatedly implements the same function/high-level concern. |
| Cyclic dependency | Two or more classes/modules/architecture components have direct or indirect dependencies on each other. |
| Bad dependency | A class/module needs to use information of other classes/modules that should not be closely related to it. |
| Complex class | There are too many lines of the code of a class, and there are many member variables, attributes and methods, responsible for executing too much work. |
| Long method | A method is too big and too complex, with many logic branches and bearing too many responsibilities. |
| Code duplication | The same code structure appears repeatedly at different locations. |
| Long parameter list | A method requires too many parameters. |
| Message chain | A class/method uses a method or attribute of a class that is not its direct friend. |
| Unused method | A method will never be used/called by other methods/classes. |

The above exemplarily describes some typical examples of error-prone patterns. Those skilled in the art may realize that this description is only example and is not used to limit the scope of the embodiments of the present invention.

In one embodiment, the method further comprises: receiving a modification record of the code; and determining the probability of an error-prone pattern in a code based on the result of static scanning of the code in Step 101 comprises: determining the probability of an error-prone pattern in the code based on a compound logic conditional expression, wherein the compound logic conditional expression comprises both the result of static scanning and the modification record, or comprises the result of static scanning but not the modification record, or comprises the modification record but not the result of static scanning.

Preferably, the probability of an error-prone pattern in the code may be determined based on a compound logic conditional expression comprising the result of static scanning and the modification record. Or, the probability of an error-prone pattern in the code may be determined based on a compound logic conditional expression comprising only the result of static scanning but not the modification record.

Preferably, determining the probability of an error-prone pattern in the code based on a compound logic conditional expression comprising the result of static scanning and/or the modification record comprises at least one of the following:
(1) Determining the probability of the existence of a shotgun surgery based on a compound logic conditional expression comprising the metrics of afferent coupling (Ca), efferent coupling (Ce) and changing method (CM).
(2) Determining the probability of the existence of a divergent change based on a compound logic conditional expression comprising the metrics of revision number (RN), instability (I) and afferent coupling, wherein instability $I=Ce/(Ca+Ce)$.
(3) Determining the probability of the existence of a big design up front based on a compound logic conditional expression comprising the metrics of line of code (LOC), line of changed code (LOCC), class number (CN), changed class number and the statistical average (AVERAGE) of the above metrics.
(4) Determining the probability of the existence of a scattered/redundant functionality based on a compound logic conditional expression comprising the metrics of structure similarity (SS) and logic similarity (LS).
(5) Determining the probability of the existence of a long method based on a compound logic conditional expression comprising the metric of cyclomatic complexity (CC).
(6) Determining the probability of the existence of a complex class based on a compound logic conditional expression comprising the metrics of line of code, attribute number (AN), method number (AN) and maximum method cyclomatic complexity (MCCmax).
(7) Determining the probability of the existence of a long parameter list based on a compound logic conditional expression comprising the metric of parameter number.
(8) Determining the probability of the existence of a message chain based on a compound logic conditional expression comprising the metric of indirect calling number (ICN).

More preferably, the predetermined thresholds in any of the compound logic conditional expressions above are adjustable.

The typical algorithms for determining error-prone patterns are described below.

For example, the compound logic conditional expression (Ca, TopValues (10%)) OR (CM, HigherThan (10))) AND (Ce, HigherThan (5)) is a typical example of compound logic conditional expressions used to determine a shotgun surgery. The compound logic conditional expression combines Ca, CM and Ce. Wherein, "OR" stands for the OR logic, while "AND" stands for the AND logic.

Wherein, the metric Ce is used to calculate the number of classes that have an attribute needed to be accessed or a method to be called by a given class. The metric CM is used to calculate the number of methods that need to access an attribute or call a method of a given class. TopValues and HigherThan are parameterized filtering mechanisms that have specific values (thresholds). TopValues is used to select, from all given members, those members with the value of a specific indicator falling within a specified highest range. HigherThan is used to select, from all the members, all of those members with the value of a specific indicator higher than a certain given threshold. Therefore, the determination strategy based on the above compound logic conditional expression means that: if the value of the metric Ca of a class falls within the range of 10% of the highest of all classes, or the value of its metric CM is higher than 10, and at the same time the value of its metric Ce is higher than 5, it should be a suspicious factor leading to a shotgun surgery.

In order to improve the flexibility and applicability of the determination algorithm, three risk levels, namely low, medium and high, can be introduced. Moreover, different thresholds (limits) will be assigned to different risk levels.

For example, Table 2 lists the typical examples of compound logic conditional expressions for determining shotgun surgeries based on the three risk levels:

TABLE 2

| Risk Level | Detecting Strategy |
| --- | --- |
| Low | ((Ca, TopValues(15%)) OR (CM, HigherThan(5))) AND (Ce, HigherThan(3)) |
| Medium | ((Ca, TopValues(10%)) OR (CM, HigherThan 10))) AND (Ce, HigherThan(5)) |
| High | ((Ca, TopValues(5%)) OR (CM, HigherThan(15))) AND (Ce, HigherThan(6)) |

The algorithm for determining shotgun surgeries described in Table 2 is based on the metrics of afferent coupling (Ca), efferent coupling (Ce) and changing method (CM).

For example, Table 3 lists the typical examples of compound logic conditional expressions for determining divergent changes based on the three risk levels:

TABLE 3

| Risk Level | Detecting Strategy |
| --- | --- |
| Low | (RN, TopValues(15%)) OR ((I, HigherThan(0.7)) AND (Ca, HigherThan(1))) |
| Medium | (RN, TopValues(10%)) OR ((I, HigherThan(0.8)) AND (Ca, HigherThan(1))) |
| High | (RN, TopValues(5%)) OR ((I, HigherThan(0.9)) AND (Ca, HigherThan(1))) |

In Table 3, the algorithm based on the compound logic conditional expressions determines divergent changes based on the metrics of instability (I), afferent coupling (Ca) and revision number (RN). The metric of revision number (RN) is the total changes made to a given class and can be obtained directly from the change history.

Moreover, instability (I) is calculated by comparing the afferent and efferent dependencies expressed by afferent coupling (Ca) and efferent coupling (Ce).

Instability $I=Ce/(Ca+Ce)$;

The basic principle behind the algorithm in Table 3 is that: if the previous revision history of a class shows that it is frequently changed (measured by the number of revisions), or we predict that it will probably be changed in the future (measured by instability), it should be regarded as a suspicion of divergent changes.

For example, Table 4 lists the typical examples of compound logic conditional expressions for determining big designs up front based on the three risk levels:

TABLE 4

| Risk Level | Detecting Strategy |
| --- | --- |
| Low | (CCN/CN > 1.33 × AVERAGE) OR (LOCC/LOC > 1.33 × AVERAGE) |

TABLE 4-continued

| Risk Level | Detecting Strategy |
| --- | --- |
| Medium | (CCN/CN > 1.5 × AVERAGE) OR (LOCC/LOC > 1.5 × AVERAGE) |
| High | (CCN/CN > 1.66 × AVERAGE) OR (LOCC/LOC > 1.66 × AVERAGE) |

Wherein, the metric of line of code (LOC) is used to calculate all the lines of the source code; the line of changed code (LOCC) is the number of lines of the source code that have been changed (added, revised or deleted) in a given period of time. The metric of class number (CN) is used to calculate the total number of classes, while the metric of changed class number (CCN) is used to calculate the number of changed classes in a given period of time. The tag AVERAGE is used to stand for the average of a given metric calculated based on a set of history data. The basic principle of the algorithm is very clear, which is: if too many changes are made to the source code in a relatively short period of time, it is very likely that a big design up front has occurred during the design process.

For C++ source code, redundant functionalities (the same or similar functions repeatedly implemented at different locations) should be determined at the method/function level. The determination algorithm should be able to compare the similarity of different methods/functions.

For example, Table 5 lists the typical examples of compound logic conditional expressions for determining scattered/redundant functionalities based on the three risk levels:

TABLE 5

| Risk Level | Detecting Strategy |
| --- | --- |
| Low | (SS = LOW) OR (SS = MEDIUM) OR ((SS = HIGH) AND (LS = LOW)) |
| Medium | (SS = HIGH) AND (LS = MEDIUM) |
| High | (SS = HIGH) AND (LS = HIGH) |

In Table 5, if the code structure and logic control flow of two given methods are highly similar, they will be regarded as suspicious of implementing similar functions. The algorithm determines scattered/redundant functionalities based on the composite metric of structure similarity (SS) and logic similarity (LS).

The measurement methods for structure similarity and logic similarity are explained below.

For example, Table 6 lists the typical examples of compound logic conditional expressions for determining the structure similarity of code based on the three risk levels:

TABLE 6

| Similarity Level | Detecting Strategy |
| --- | --- |
| Low | (PS > 0.8) AND (DLOC < 15) AND (DLOC/LOCmax < 0.2) |
| Medium | (RVS = 1) AND (PS > 0.8) AND (DLOC < 10) AND (DLOC/LOCmax < 0.1) |
| High | (RVS = 1) AND (PS > 0.9) AND (DLOC < 5) AND (DLOC/LOCmax < 0.05) |

In Table 6, code structure similarity is determined based on parameter similarity (PS), return value similarity (RVS) and difference in lines of code (DLOC).

Wherein, parameter similarity (PS) is used to measure the similarity of the input parameters between two given methods, and is calculated as follows:

$$PS = STPN / PNmax;$$

where PN stands for the number of input parameters. PNmax means comparing the metric PN of the two given methods and selecting the maximum one. STPN stands for the number of input parameters of the same data type.

For example, if the parameter lists of two given methods are:

Method A (float a, int b, int c); and method B (float d, int e, long f, char g).

Then, STPN is 2, because the two methods both have at least one input parameter of the float (floating point) type and one input parameter of the int (integer) type. The PN value of method A is 4, the PN value of method B is 5, and therefore the value of PNmax is 5. Thus, the calculated metric PS is 0.4 (⅖).

The metric of return value similarity (RVS) is either 0 or 1. RVS is 1 when the two given methods have the same type of return values; otherwise, RVS is 0.

The difference in lines of code (DLOC) means the difference in lines of code (LOC) between two given methods. It can only be a positive value. Therefore, if method A has 10 lines of source code while method B has 15 lines of source code, the DLOC between method A and method B is 5.

LOCmax means comparing the LOC of two given methods and selecting the maximum value between them.

For example, Table 7 lists the typical examples of compound logic conditional expressions for determining the logic similarity of code based on the three risk levels, which are used to compare the similarity of the logic flow between two given methods.

TABLE 7

| Similarity Level | Detecting Strategy |
| --- | --- |
| Low | (DCC < 5) AND (DCC/CCmax < 15) AND (CFS > 0.85) |
| Medium | (DCC < 3) AND (DCC/CCmax < 10) AND ((CFS = 1) OR (CFSS = 1)) |
| High | (DCC < 3) AND (DCC/CCmax < 10) AND (CFS = 1) AND (CFSS =1) |

In Table 7, the logic similarity (LS) of code is compared based on the metrics of cyclomatic complexity (CC), difference cyclomatic complexity (DCC) and control flow similarity (CFS).

Cyclomatic complexity (CC) is a metric known to all, which measures the complexity of a method through calculating the number of independent logical paths. Many static source code analysis tools provide the capability of calculating this metric.

Difference cyclomatic complexity (DCC) is calculated based on the metric CC. It can only be a positive value. Assuming that the value of metric CC of method A is 20, and the value of metric CC of method B is 23, then the difference cyclomatic complexity (DCC) between method A and method B is 3. CCmax means comparing the metric CC of two given methods and selecting the maximum one.

Control flow similarity (CFS) is used to measure the similarity of the control flow statement between two given methods. This will be explained taking C++ language as an example. In C++ language, logic control statements include if, then, else, do, while, switch, case, for loop, etc. CFS is calculated based on the logic control blocks in a given method.

Assuming there are two given methods, A and B, we put the control flow statements used in the methods respectively in two sets, i.e., setA and setB:

$$setA = \{if, for, switch, if, if\};$$

$$setB = \{if, switch, for, while, if\};$$

then the intersection between setA and setB means the logic control blocks that have appeared in both methods: intersection=setA∩setB={if, for, switch, if}.

The metric CFS is calculated by the following equation:

$$CFS = (NE \text{ of the intersection})/MAX(NE \text{ of } setA, NE \text{ of } setB) = 4/5 = 0.8$$

Here, NE stands for the number of elements in a set; MAX(NE of setA, NE of setB) stands for the maximum value between the NE of setA and the NE of setB.

The metric CFSS is used to calculate the similarity between control flow sequences, and is valid only when the logic control blocks of the same type in one method are all included in the other method. It needs two values: 0 and 1. CFSS will be 1 when all the logic control blocks in one method appear in the same order in the other method; CFSS should be 0 when any control block appears in a different order.

For example, if the control blocks of three given methods are as follows:

$$setA = \{if, if, for, if\}$$

$$setB = \{if, for, if\}$$

$$setC = \{switch, if, if, for\},$$

it can be seen that setA fully includes setB. Each logic control block in setB appears in setA in the same order, and therefore the CFSS between method A and method B is 1. Although setC includes all the elements in setB, they appear in a different order, and therefore the CFSS between method B and method C is 0.

For the purpose of description, some examples are given below for codes that are in different forms but are logically repeated.

Code 1:

```
bool PVProcessing:: isVrefInRange(const Float32_t
vRefIntVoltage)
{
  bool retVal=FALSE;
  if(vRefInRange<=pidSssVrefIntLowerLimit)
  {
    itsIDiagnoisticsHandler.setCondition(VREF_INT_TOO_LOW);
  }
  else
  {
```

-continued

```
    if(vRefInRange>=pidSssVrefIntUpperLimit)
    {
      itsIDiagnoisticsHandler.setCondition(VREF_INT_TOO_HIGH);
    }
    else
    {
      retVal=TRUE;
    }
  }
  return retVal;
}
```

Code 2:

```
bool PVProcessing:: isVddhInRange(const Float32_t
vddhVoltage)
{
  Bool retVal=FALSE;
  If(vddhVoltage<=pidSssVddIntLowerLimit)
  {
    itsIDiagnoisticsHandler.setCondition(VDDH_TOO_LOW);
  }
  else
  {
    if (vddhVoltage>=pidSssVddhUpperLimit)
    {
      itsIDiagnoisticsHandler.setCondition(VDDH_TOO_HIGH);
    }
    else
    {
      retVal=TRUE;
    }
  }
  return retVal;
}
```

Code 1 and code 2 above are different in form but repeated in logic. It is very easy for a human evaluator to point out the redundant functionality of code 1 and code 2, because the two methods implement very similar functions. However, it is very difficult for most static analysis tools to detect such cases where the codes are different, but the logics are similar. These tools generally can only look for simple repetitions of codes, i.e., repeated codes generated through "copy-paste" of the same code block. The two methods here implement the same function, but the variables used have different names. Therefore, although the internal logics are very similar, due to some differences in the source codes, static analysis tools cannot determine that these are two segments of logically duplicated code. For the embodiments of the present invention, the metric of structure similarity (SS) of the codes is calculated first. Since both methods have a float parameter and return a bool value, the values of metrics PS and RVS are both 1. The two methods have the same metric LOC, and therefore the metric DLOC=0. Then, the metric structure similarity (SS) of the two given methods is classified as HIGH. For the metric of logic similarity (LS), since the two methods have the same value of the metric cyclomatic complexity (CC), the value of the metric DCC is 0. The two methods have the same logic control block ({if/else, if/else}) and it appears in the same sequence, and therefore the values of both CFS and CFSS are 1. Therefore, the metric logic similarity (LS) of the two given methods is also classified as HIGH.

After the metrics SS and LS are calculated, by applying the algorithm in Table 5, the risk that the two methods have the problem of redundant functionality will be classified as HIGH.

For example, Table 8 lists the typical examples of compound logic conditional expressions for determining long methods based on the three risk levels.

TABLE 8

| Risk Level | Detecting Strategy |
| --- | --- |
| Low | (CC, HigherThan(15)) |
| Medium | (CC, HigherThan(20)) |
| High | (CC, HigherThan(25)) |

It can be seen from Table 8 that long methods can be determined based on cyclomatic complexity (CC).

For example, Table 9 lists the typical examples of compound logic conditional expressions for determining complex classes based on the three risk levels.

TABLE 9

| Risk Level | Detecting Strategy |
| --- | --- |
| Low | (LOCG, TopValues(15%)) AND (((AN, TopValues(15%)) AND (MN, TopValues(15%))) OR (MCCmax, TopValues(15%))) |
| Medium | (LOC, TopValues(10%)) AND (((AN, TopValues(10%)) AND (MN, TopValues(10%))) OR (MCCmax, TopValues(10%))) |
| High | (LOC, TopValues(5%)) AND (((AN, TopValues(5%)) AND (MN, TopValues(5%))) OR (MCCmax, TopValues(5%))) |

In Table 9, complex classes are determined based on the metrics of line of code (LOC), attribute number (AN), method number (MN) of the source code and maximum method cyclomatic complexity (MCCmax) of the given class. Wherein, the attribute number (AN) is used to calculate the number of attributes of the given class; and the method number (MN) is used to calculate the number of methods in the given class. The maximum method cyclomatic complexity (MCCmax) of the given class is the maximum value of CC of the methods in the given class.

The basic principle of Table 9 is: a code with too many lines and at the same time with classes having too many attributes and methods or a class having at least one very complex method will be identified as suspicious of having a complex class.

For example, Table 10 lists the typical examples of compound logic conditional expressions for determining long parameter lists based on the three risk levels.

TABLE 10

| Risk Level | Detecting Strategy |
| --- | --- |
| Low | (PN, HigherThan(4)) |
| Medium | (PN, HigherThan(6)) |
| High | (PN, HigherThan(8)) |

In Table 10, the parameter number (PN) is used to measure the number of the input parameters of a given method. The basic principle of the algorithm shown in Table 10 is: a method with more than 4 parameters should be regarded as suspicious of having a long parameter list.

For example, Table 11 lists the typical examples of compound logic conditional expressions for determining message chains based on the three risk levels.

TABLE 11

| Risk Level | Detecting Strategy |
| --- | --- |
| Low | (ICN, TopValues (15%)) AND (ICN > 3) |
| Medium | (ICN, TopValues (10%)) AND (ICN > 5) |
| High | (ICN, TopValues (5%)) AND (ICN > 6) |

In Table 11, message chains are determined based on the indirect calling number (ICN). The metric ICN is used to calculate the number of those efferent references in all the efferent references of a given method that are not directly calling its direct friends.

Here, calling a direct friend means that:

(1) the given method directly calls other methods in the class where it is;

(2) the given method directly calls public variables or methods in a range visible to it;

(3) the given method directly calls methods in the objects of its input parameters; or (4) the given method directly calls methods of the local objects that it creates.

Except for the four types above, all the other efferent callings sent by the given method will be classified as indirect callings and counted in ICN.

Those skilled in the art can realize that error-prone patterns such as code duplication, unused methods, cyclic dependency, and bad dependency can be directly identified by static code analysis tools, and therefore their determination algorithms will not be described in detail in the embodiments of the present invention.

Step 102: inputting the probability determined in Step 101 into an artificial neural network (ANN), and, based on the artificial neural network, determining a prediction result of whether the code violates a predetermined design principle and a quantified degree to which the code violates the design principle.

After determining the probability of the error-prone mode, the embodiments of the present invention can evaluate the software design quality according to the prediction result of the artificial neural network. This can be achieved by mapping the probabilities of error-prone patterns to key design principles.

Good software design should focus on reducing the business risks associated with building technical solutions. It needs to be sufficiently flexible to adapt to technical changes in hardware and software, as well as changes in user needs and application scenarios. In the software industry, people generally agree that effectively following some key design principles can minimize R&D costs and maintenance workload, and improve software availability and scalability. Practice has proved that the implementation and execution of these design principles is essential for ensuring software quality.

For example, design principles may include at least one of the following: Separation of Concerns, Single Responsibility Principle, Least Knowledge, Don't Repeat Yourself, Minimize Upfront Design, etc.

Table 12 is an example description of the five most well-known principles for software design.

TABLE 12

| Design principle | Description |
| --- | --- |
| Separation of Concerns (SOC) | The functions of the entire system should be separated into distinct sections, and overlapping should be minimized. |
| Single Responsibility Principle (SRP) | Each component or module should be relatively independent, and should be responsible for only one specific feature or function point. |
| Least Knowledge (LCD) | A component or object should not know the internal details of other components or objects. |
| Don't Repeat Yourself (DRY) | Any feature or function should be implemented at only one location of the software. It should not be repeated in other components or modules. |
| Minimize Upfront Design (YAGNI) | Big design up front for an entire system should be avoided if the requirements may change. |

The above design principles will be described in more details below.

The principle of Separation of Concerns (SOC) is one of the basic principles for object-oriented programming. If correctly followed, it will enable software to have the characteristics of loose coupling and high cohesion. Therefore, error-prone patterns, for example, cyclic dependency and bad dependency, which reflect the tight coupling characteristic and the symptoms of incorrect use of component functions, are obvious signs that the principle of SOC has not been followed in the design process. In addition, SOC also helps to minimize the amount of work required to change the software. Therefore, it is also related to error-prone patterns (for example, shotgun surgery, divergent change, etc.) that cause difficulties in implementing changes.

Single Responsibility Principle (SRP): if the scope is narrowed to the level of classes, this principle may be interpreted as "There should not be more than one reason for changing a class". Therefore, error-prone patterns (for example, shotgun surgery and divergent change) that represent frequent code changes may be related to violations of SRP. In addition, methods/classes taking too many responsibilities are generally logically very complex. Therefore, error-prone patterns (for example, complex class, long method and long parameter list) indicating internal complexity are also related to this principle.

The principle of Least Knowledge (LOD): this principle is also called the Law of Demeter, or LoD, which states that, "Don't talk to strangers". It indicates that a specific class should only talk to its "close friends" but not to "friends of its friends". Therefore, error-prone patterns like message chain indicate that this principle is not followed. This principle also opposes entanglement of the details of one class with other classes across different architectural levels. Therefore, error-prone patterns such as cyclic dependency and bad dependency are also related to it.

Don't Repeat Yourself (DRY): this principle aims to prevent redundancy in the source code, which may otherwise lead to logical contradictions and unnecessary maintenance work. The error-prone patterns of code duplication and redundant functionality are direct indications of violations of the principle of DRY.

Minimize Upfront Design: in general, this principle states that "big" design is unnecessary, and most of the design should be implemented throughout the entire software development process. Therefore, the error-prone pattern BDUF is an obvious violation of this principle. Minimize Upfront Design is also called YAGNI ("You are not gonna need it"), which means that we should only do the designs strictly required for achieving the objectives. Therefore, an identification of an unused method also indicates that this principle is possibly not followed.

In the embodiments of the present invention, both the error-prone patterns and the design principles can be flexibly expanded. If needed, more error-prone patterns and design principles can be added, in order to improve flexibility and applicability.

The above exemplarily describes some typical examples of design principles. Those skilled in the art may realize that this description is only example and is not used to limit the scope of the embodiments of the present invention.

Table 13 lists the correspondence between error-prone patterns and design principles. Wherein, "X" means the error-prone pattern violates the design principle.

TABLE 13

| | Separation of Concerns | Single Responsibility Principle | Least Knowledge | Don't Repeat Yourself | Minimize Upfront Design |
| --- | --- | --- | --- | --- | --- |
| Shotgun surgery | X | X | | | |
| Divergent change | X | X | | | |
| Big design up front | | | | | X |
| Scattered/redundant functionality | | | | X | |
| Cyclic dependency | X | | X | | |
| Bad dependency | X | | X | | |
| Complex class | | X | | | |
| Long method | | X | | | |
| Code duplication | | | | X | |
| Long parameter list | | X | | | |
| Message chain | | | X | | |
| Unused method | | | | | X |

The embodiments of the present invention may use artificial intelligence (AI) algorithms to simulate the relationships in Table 13 above, and then evaluate the compliance with these key design principles based on the occurrence of related error-prone patterns.

In one embodiment, the artificial neural network comprises connections between error-prone patterns and design principles; and determining, based on the artificial neural network, a prediction result of whether the code violates predetermined design principles and a quantified degree to which the code violates the design principles comprises: based on the connections in the artificial neural network and the probabilities of the error-prone patterns, determining a prediction result of whether the code violates the design principles and a quantified degree to which the code violates the design principles.

Here, the artificial neural network is a computing model, which comprises a large number of nodes (or neurons) connected to each other. Each node represents a specific output function, called the activation function. Each connection between two nodes represents a weighted value of the signal passing through the connection, called a weight, which is equivalent to the memory of an artificial neural network. The output of the network varies as the connection method of the network, the weight value and the activation function change. Preferably, the method further comprises: adjusting the weight of the connection in the artificial neural network based on a self-learning algorithm.

Preferably, connections between error-prone patterns and design principles include at least one of the following: a connection between shotgun surgery and Separation of Concerns; a connection between shotgun surgery and Single Responsibility Principle; a connection between divergent change and Separation of Concerns; a connection between divergent change and Single Responsibility Principle; a connection between big design up front and Minimize Upfront Design; a connection between scattered functionality and Don't Repeat Yourself; a connection between redundant functionality and Don't Repeat Yourself; a connection between cyclic dependency and Separation of Concerns; a connection between cyclic dependency and Least Knowledge; a connection between bad dependency and Separation of Concerns; a connection between bad dependency and Least Knowledge; a connection between complex class and Single Responsibility Principle; a connection between long method and Single Responsibility Principle; a connection between code duplication and Don't Repeat Yourself; a connection between long parameter list and Single Responsibility Principle; a connection between message chain and Least Knowledge; and a connection between unused method and Minimize Upfront Design.

Wherein, in order to infer the target (violating design principles (such as SOC, SRP, LOD, DRY, and YAGNI)) from an error-prone pattern (called extracted feature in the following algorithm), artificial intelligence algorithms and artificial intelligence neural networks are applied to establish the relationship between error-prone patterns and design principles.

Figure 2:
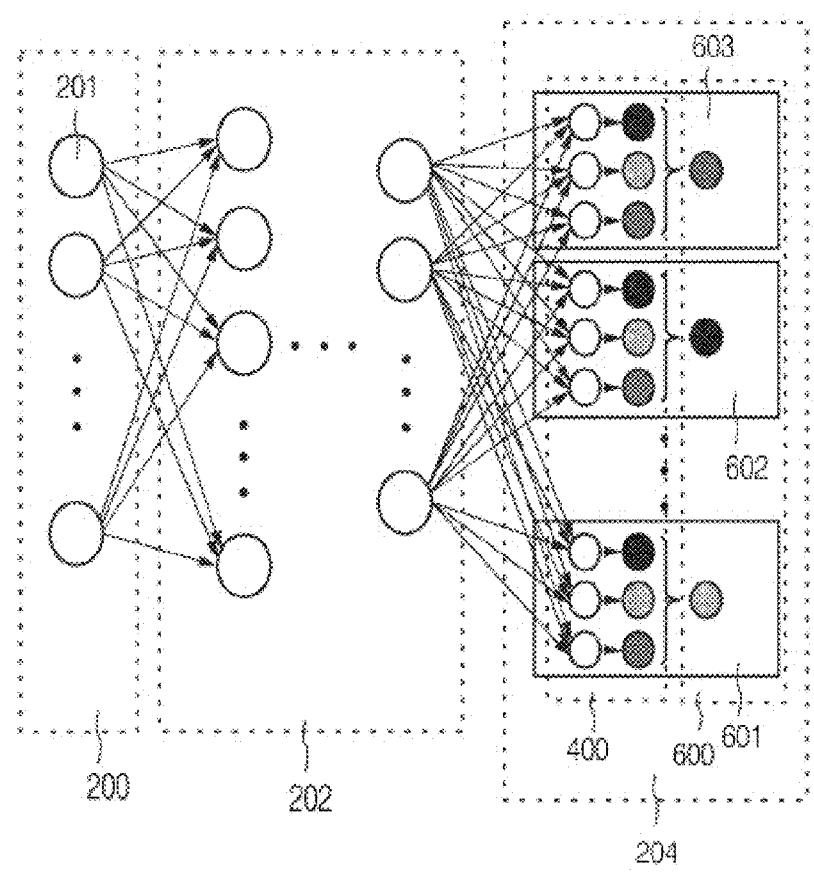
FIG. 2 is a structural diagram of the artificial neural network of the embodiments of the present invention.

FIG. 2 is a structural diagram of the artificial neural network of the embodiments of the present invention.

In FIG. 2, the artificial neural network comprises an input layer 200, a hidden layer 202, and an output layer 204, wherein the output layer 204 comprises a softmax layer 400 and a maximum probability layer 600. The maximum probability layer 600 comprises various predetermined design principles, such as Minimize Upfront Design 601, Single Responsibility Principle 602, Separation of Concerns 603, etc. In FIG. 2, the neuron (also called unit) represented by a circle in the input layer 200 is an error-prone pattern 201, which is inputted through linear transformation by a weight matrix, and nonlinear transformation is performed on the input by the activation function, in order to improve the variability of the entire model and the representational power of the knowledge model. The significance of the artificial neural network is based on the assumption that there is a hidden mathematical equation that can represent the relationship between the input of an extracted feature and the output of a violation of a design principle, and the parameters in the mathematical equation are unknown. For the artificial neural network, a training dataset may be used to train the model, and a large number (for example, hundreds) of internal parameters recorded in the dataset are iteratively updated until the parameters are so trained that the equation conforms to the relationship between the input and the output. At this point, these parameters reflect the essence of the model; the model can represent the connections between error-prone patterns and design principles.

Input layer 200: the input to the network is a feature (probability of an error-prone pattern) extracted in the code quality inspection. For example, if there is a segment of code that has a high risk of shotgun surgery, a number can be used to indicate the risk level (for example, 0.8 for high risk, 0.5 for medium risk, and 0.3 for low risk). For example, if the model input is defined as 12 patterns, 12 numbers are used to represent the quality characteristics of the code. These numbers form digital vectors and will be used as the model input.

The output of the output layer 204 is the predicted type of a violation of the design principles. For each code snippet, an attempt will be made to detect the probability of the violation of a principle, and the probability will be classified as one of the three levels: low, medium and high risks. Therefore, for each of the various design principles such as Minimize Upfront Design 601, Single Responsibility Principle 602 and Separation of Concerns 603, there will be three output units corresponding to three types. Specifically, the output of the hidden layer 202, a 3-element vector, is used as the input vector of the softmax layer 400 in the output layer 204. In the softmax layer 400, the elements in the vector are normalized to decimals in the range of 0 to 1 and totaling to 1 by the softmax function, in order to convert these elements into the probability of a type. The maximum probability layer 600 predicts the probability that the analyzed code violates a specific principle by selecting the type with the highest value as the final output.

For the artificial neural network shown in FIG. 2, its training process involves forward propagation and back propagation. Forward propagation is a network process that, based on current parameters (weights), enhances the degree of freedom of the model and generates a prediction result (i.e., the probability of the violation of a principle) by use of linear transformation of matrix multiplication and nonlinear transformation of excitation functions (sigmoid, tank, and relu). In combination with back propagation, the parameters used to calculate the prediction can be better updated to generate a prediction closer to the true label (a principle violation does exist in this code, etc.). After a large amount of training (for example, thousands of steps), the prediction is almost the same as the true label, which means that the parameters in the model can form the relationship between the input (feature or metric) and the output (violated principle). In the back propagation step, the gap ("loss") is first calculated as the difference between the predicted value and the actual label, and the loss is generated by a cost function. The "loss" provides a numerical measure of prediction error for the network. By applying chain rules, the loss value can be propagated to each neuron in the network, and the parameters related to that neuron can be modified accordingly. By repeating this process many times (for example, a thousand times), the loss value becomes lower and lower, and the predicted value becomes closer and closer to the true label.

The training data of the artificial neural network comprises error-prone patterns and manual evaluation of whether design principles are violated. The training data may be collected from different projects, which have completely different characteristics. Therefore, after training, the artificial neural network model can reflect project characteristics in different industries, different development processes and different situations. That is, a well-trained model can be very flexible and scalable, and can be used to analyze different types of projects without pre-configuration according to the characteristics of a project, because the model can learn through training data.

Another benefit of the use of the artificial neural network is that the model is based on self-learning algorithms. The model can update internal parameters to dynamically adjust its new data input. When the trained model receives a new input and propagates it forward to predict the violation of a principle, a human reviewer can check the prediction result and provide judgment. If the judgment is negative to the prediction, the system can obtain this round of forward propagation of the input and the final human judgment to generate a new data sample point as a future training set, and the model is trained on previous errors and becomes more and more accurate after deployment. Prior to this step, the code review system has successfully completed the steps of accessing the user source code, code scanning for code quality analysis, identifying error-prone patterns, and classifying error-prone patterns to match violations of design principles.

Step 103: evaluating the design quality of the code based on the prediction result.

In order to evaluate software quality, a basic principle to be considered may be that, if a design principle is followed correctly during the design process, the related error-prone patterns should not be identified in the source code. That is, if a certain error-prone pattern is identified, the principle may be violated. Therefore, by observing the occurrence of error-prone patterns, we can measure the compliance with key design principles, and then use traceability to evaluate design quality.

In one embodiment, evaluating the design quality of the code based on the prediction result comprises at least one of the following: evaluating the design quality of the code based on whether it violates a predetermined design principle, wherein not violating the predetermined design principle is better in the design quality than violating the predetermined design principle; and evaluating the design quality of the code based on the quantified degree to which it violates the design principle, wherein the quantified degree to which it violates the design principle is inversely proportional to how good the design quality is evaluated to be.

In one embodiment, in a typical software development environment, the source code is stored in a central repository, and all changes are controlled. The source code to be reviewed and its revision/change history information (which can be obtained from software configuration management tools such as ClearCase, Subversion, Git, etc.) will be used as the input of the code evaluation method of the present invention. When applying the code evaluation method of the present invention, the user firstly accesses the source code repository and the revision/change history, and generates findings related to code metrics and quality with the help of static code analysis tools. An error-prone pattern detector captures this information together with the revision/change information, and calculates the possibility of any error-prone pattern in the source code. Then, an AI model (for example, an artificial neural network) reads these probabilities as the input, to predict the probabilities of the violation of design principles based on the pre-trained connection between error-prone patterns and design principles. Then, a design quality report can be generated based on the prediction result, including information of the predicted violations of design principles and error-prone patterns, and the user can improve the code quality accordingly.

Based on the above description, the embodiments of the present invention also provide a system for evaluating code design quality.

Figure 3:
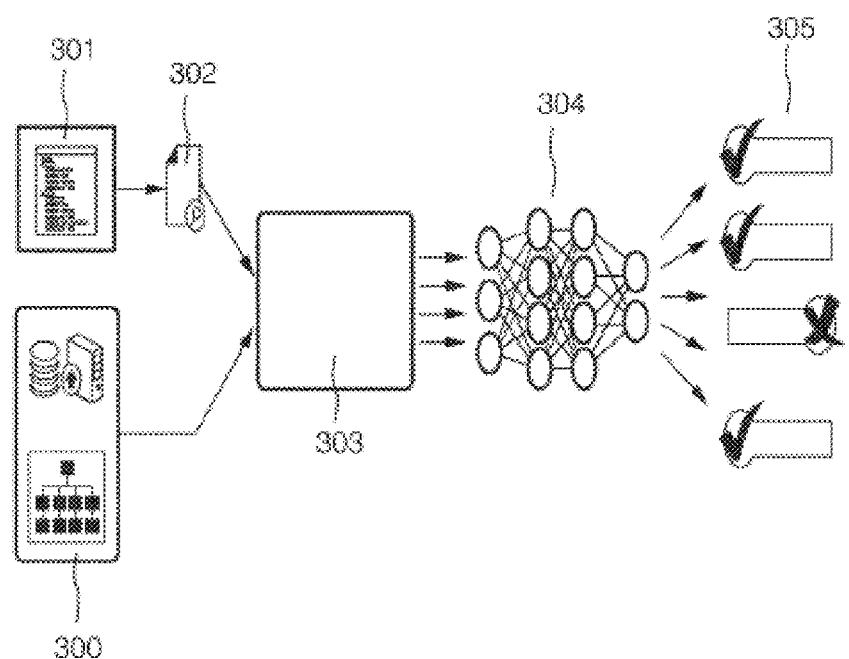
FIG. 3 is a structural diagram of the system for evaluating code design quality of the embodiments of the present invention.

FIG. 3 is a structural diagram of the system for evaluating code design quality of the embodiments of the present invention.

As shown in FIG. 3, the system for evaluating code design quality comprises:

a code repository 300, configured to store a code to be evaluated 301;

a static scanning tool 302, configured to statically scan the code to be evaluated 301;

an error prone pattern detector 303, configured to determine the probability of an error-prone pattern in the code based on the result of static scanning output by the static scanning tool 302; and an artificial neural network 304, configured to determine, based on the probability, a prediction result 305 of whether the code violates a predetermined design principle and a quantified degree to which the code violates the design principle, wherein the prediction result 305 is used to evaluate the design quality of the code. For example, the artificial neural network 304 can automatically evaluate the design quality of the code based on the prediction result 305. Preferably, the artificial neural network 304 displays the prediction result 305, and the user manually evaluates the design quality of the code based on the display interface of the prediction result 305.

In one embodiment, the code repository 301 is further configured to store a modification record of the code; and the static scanning tool 302 is configured to determine the probability of an error-prone pattern in the code based on a compound logic conditional expression comprising the result of static scanning and/or the modification record.

Based on the above description, the embodiments of the present invention also provide an apparatus for evaluating code design quality.

Figure 4:
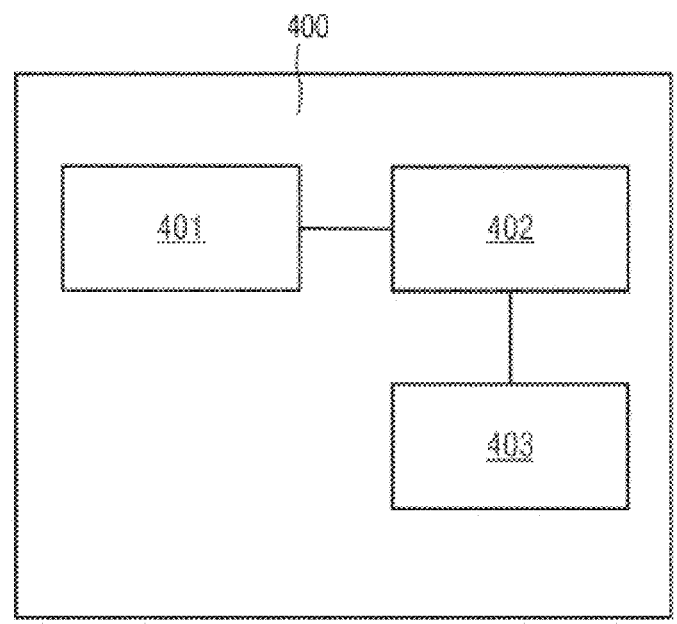
FIG. 4 is a structural diagram of the apparatus for evaluating code design quality of the embodiments of the present invention.

FIG. 4 is a structural diagram of the apparatus for evaluating code design quality of the embodiments of the present invention.

As shown in FIG. 4, the apparatus for evaluating code design quality 400 comprises:

a determining module 401, configured to determine the probability of an error-prone pattern in a code based on the result of static scanning of the code;

a prediction result determining module 402, configured to input the probability into an artificial neural network, and, based on the artificial neural network, to determine a prediction result of whether the code violates a predetermined design principle and a quantified degree to which the code violates the design principle; and an evaluation module 403, configured to evaluate the design quality of the code based on the prediction result.

In one embodiment, the error-prone patterns include at least one of the following: shotgun surgery; divergent change; big design up front; scattered/redundant functionality; cyclic dependency; bad dependency; complex class; long method; code duplication; long parameter list; message chain; and unused method.

In one embodiment, the design principles include at least one of the following: Separation of Concerns; Single Responsibility Principle; Least Knowledge; Don't Repeat Yourself; and Minimize Upfront Design.

In one embodiment, the determining module 401 is further configured to receive a modification record of the code, wherein determining the probability of an error-prone pattern in a code based on the result of static scanning of the code comprises: determining the probability of an error-prone pattern in the code based on a compound logic conditional expression comprising the result of static scanning and the modification record.

In one embodiment, determining the probability of an error-prone pattern in the code based on a compound logic conditional expression comprising the result of static scanning and/or the modification record comprises at least one of the following: determining the probability of the existence of a shotgun surgery based on a compound logic conditional expression comprising the metrics of afferent coupling, efferent coupling and changing method; determining the probability of the existence of a divergent change based on a compound logic conditional expression comprising the metrics of revision number, instability and afferent coupling; determining the probability of the existence of a big design up front based on a compound logic conditional expression comprising the metrics of line of code, line of changed code, class number, changed class number and the statistical average of the above metrics; determining the probability of the existence of a scattered functionality based on a compound logic conditional expression comprising the metrics of structure similarity and logic similarity; determining the probability of the existence of a redundant functionality based on a compound logic conditional expression comprising the metrics of structure similarity and logic similarity; determining the probability of the existence of a long method based on a compound logic conditional expression comprising the metric of cyclomatic complexity; determining the probability of the existence of a complex class based on a compound logic conditional expression comprising the metrics of line of code, attribute number, method number and maximum method cyclomatic complexity; determining the probability of the existence of a long parameter list based on a compound logic conditional expression comprising the metric of parameter number; determining the probability of the existence of a message chain based on a compound logic conditional expression comprising the metric of indirect calling number, etc.

In one embodiment, the artificial neural network comprises connections between error-prone patterns and design principles; and the prediction result determining module 402 is further configured to determine, based on the connections in the artificial neural network and the probabilities of error-prone patterns, a prediction result of whether the code violates the design principles and a quantified degree to which the code violates the design principles.

In one embodiment, the evaluation module 403 is configured to evaluate the design quality of the code based on whether it violates a predetermined design principle, wherein not violating the predetermined design principle is better in the design quality than violating the predetermined design principle; and to evaluate the design quality of the code based on the quantified degree to which it violates the design principle, wherein the quantified degree to which it violates the design principle is inversely proportional to how good the design quality is evaluated to be.

In one embodiment, the connections between error-prone patterns and design principles include at least one of the following: a connection between shotgun surgery and Separation of Concerns; a connection between shotgun surgery and Single Responsibility Principle; a connection between divergent change and Separation of Concerns; a connection between divergent change and Single Responsibility Principle; a connection between big design up front and Minimize Upfront Design; a connection between scattered functionality and Don't Repeat Yourself; a connection between redundant functionality and Don't Repeat Yourself; a connection between cyclic dependency and Separation of Concerns; a connection between cyclic dependency and Least Knowledge; a connection between bad dependency and Separation of Concerns; a connection between bad dependency and Least Knowledge; a connection between complex class and Single Responsibility Principle; a connection between long method and Single Responsibility Principle; a connection between code duplication and Don't Repeat Yourself; a connection between long parameter list and Single Responsibility Principle; a connection between message chain and Least Knowledge; and a connection between unused method and Minimize Upfront Design.

Figure 5:
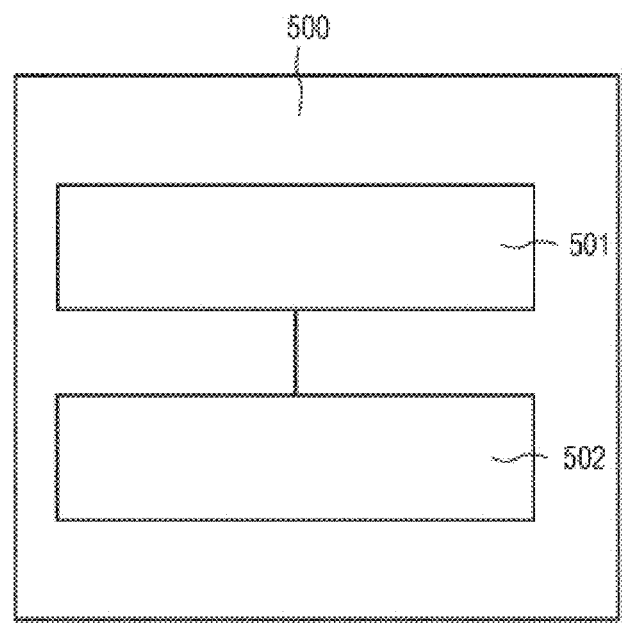
FIG. 5 is a structural diagram of the apparatus having a processor and a memory for evaluating code design quality of the embodiments of the present invention.

FIG. 5 is a structural diagram of the apparatus having a processor and a memory for evaluating code design quality of the embodiments of the present invention.

As shown in FIG. 5, the apparatus for evaluating code design quality 500 comprises a processor 501 and a memory 502.

The memory 502 stores an application that can be executed by the processor 501, which is used to cause the processor 501 to execute the method for evaluating code design quality as described above.

Wherein, the memory 502 may be specifically implemented as a variety of storage media such as electrically erasable programmable read-only memory (EEPROM), flash memory, programmable read-only memory (PROM), etc. The processor 501 may be implemented to comprise one or more central processing units or one or more field-programmable gate arrays, wherein the field-programmable gate array integrates the core(s) of one or more central processing units. Specifically, the central processing unit or central processing unit core may be implemented as a CPU or MCU.

It should be noted that not all steps and modules in the above flowcharts and structural diagrams are necessary, and some steps or modules can be ignored based on actual needs. The sequence of execution of the steps is not fixed, and can be adjusted as needed. A functional division of the modules is used only to facilitate the description. In actual implementation, a module may be implemented by multiple modules, and the functions of multiple modules may be implemented by a single module. These modules may be located in a single device or in different devices.

The hardware modules in each embodiment may be implemented mechanically or electronically. For example, a hardware module may comprise specially designed permanent circuits or logic devices (for example, dedicated processors, such as FPGA or ASIC) to complete specific operations. A hardware module may also comprise programmable logic devices or circuits temporarily configured by software (for example, general-purpose processors or other programmable processors) for performing specific operations. Whether to specifically use mechanical methods or dedicated permanent circuits or temporarily configured circuits (such as software configuration) to implement hardware modules may be determined according to cost and schedule considerations.

The present invention of an embodiment also provides a machine-readable storage medium, which stores an instruction used to cause a machine to execute the method described herein. Specifically, a system or device equipped with a readable storage medium may be provided, the software program code for implementing the functions of any of the above embodiments is stored on the readable storage medium, and a computer (or CPU or MPU) of the system or device is configured to read and execute the program code stored in the storage medium. In addition, the operating system operating on the computer may also be used to perform part or all of the actual operations through instructions based on the program code. It is also possible to write the program code read from the storage medium to the memory provided in an expansion board inserted into the computer or to the memory provided in an expansion unit connected to the computer, and then the program code-based instructions cause the CPU, etc. mounted on the expansion board or the expansion unit to perform part and all of the actual operations, so as to implement the functions of any of the above embodiments.

Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer or a cloud via a communication network.

The above are only the preferred embodiments of the present invention and are not used to limit the scope of the present invention. Any modification, equivalent replacement and improvement made without departing from the motivation and principle of the present invention shall be included in the scope of the present invention.

It should be noted that not all steps and modules in the above processes and system structural diagrams are necessary, and some steps or modules may be ignored based on actual needs. The sequence of execution of the steps is not fixed, and can be adjusted as needed. The system structure described in the above embodiments may be a physical structure or a logical structure, i.e., some modules may be implemented by the same physical entity, or some modules may be implemented by multiple physical entities, or may be implemented by certain components in several independent devices working together.

The present invention has been demonstrated and described in detail through the drawings and preferred embodiments above. However, the present invention is not limited to these disclosed embodiments. Based on the above embodiments, those skilled in the art can know that the code review methods in the different embodiments above may be combined to obtain more embodiments of the present invention, and these embodiments also fall within the scope of the present invention.

The invention claimed is:

1. A method for evaluating code design quality, comprising:
receiving a modification record of the code;
determining probabilities of error-prone patterns in a code based on a compound logic conditional expression including at least one of a result of static scanning of the code and the modification record, including at least one of,
determining a probability of an existence of a shotgun surgery based on a compound logic conditional expression including metrics of afferent coupling, efferent coupling and changing method,
determining a probability of an existence of a divergent change based on a compound logic conditional expression including metrics of revision number, instability and afferent coupling,
determining a probability of an existence of a big design up front based on a compound logic conditional expression including metrics of line of code, line of changed code, class number, changed class number and a statistical average of the metrics,
determining a probability of an existence of a scattered/redundant functionality based on a compound logic conditional expression including metrics of structure similarity and logic similarity,
determining a probability of an existence of a long method based on a compound logic conditional expression including a metric of cyclomatic complexity,
determining a probability of an existence of a complex class based on a compound logic conditional expression including metrics of line of code, attribute number, method number and maximum method cyclomatic complexity,
determining a probability of an existence of a long parameter list based on a compound logic conditional expression including a metric of parameter number, or
determining a probability of an existence of a message chain based on a compound logic conditional expression including a metric of indirect calling number;
inputting the probabilities of each of the error-prone patterns into an artificial neural network;
based on the artificial neural network, connecting the probabilities of each of the error-prone patterns to design principles;
based on the artificial neural network and the connections, determining a prediction result of whether the code violates the design principles and a quantified degree to which the code violates the design principles; and
evaluating the design quality of the code based on the prediction result.

2. The method for evaluating code design quality of claim 1, wherein at least one of,
the error-prone patterns include at least one of: shotgun surgery, divergent change, big design up front, scattered/redundant functionality, cyclic dependency, bad dependency, complex class, long method, code duplication, long parameter list, message chain, and unused method; and
the design principles include at least one of: Separation of Concerns, Single Responsibility Principle, Least Knowledge, Don't Repeat Yourself, and Minimize Upfront Design.

3. The method for evaluating code design quality of claim 1, wherein thresholds in the compound logic conditional expression are adjustable.

4. The method for evaluating code design quality of claim 1, wherein the artificial neural network comprises connections between the error-prone patterns and design principles; and
wherein the determining, based on the artificial neural network, of the prediction result of whether the code violates a design principle and a quantified degree to which the code violates the design principle comprises:
obtaining, based on the connections in the artificial neural network and probabilities of the error-prone patterns, a prediction result of whether the code violates the design principles and a quantified degree to which the code violates the design principles.

5. The method for evaluating code design quality of claim 4, further comprising:
adjusting weights of the connections in the artificial neural network based on a self-learning algorithm.

6. The method for evaluating code design quality of claim 4, wherein the connections between the error-prone patterns and the design principles include at least one of:
a connection between shotgun surgery and Separation of Concerns; a connection between shotgun surgery and Single Responsibility Principle; a connection between divergent change and Separation of Concerns; a connection between divergent change and Single Responsibility Principle; a connection between big design up front and Minimize Upfront Design; a connection between scattered functionality and Don't Repeat Yourself; a connection between redundant functionality and Don't Repeat Yourself; a connection between cyclic dependency and Separation of Concerns; a connection between cyclic dependency and Least Knowledge; a connection between bad dependency and Separation of Concerns; a connection between bad dependency and Least Knowledge; a connection between complex class and Single Responsibility Principle; a connection between long method and Single Responsibility Principle; a connection between code duplication and Don't Repeat Yourself; a connection between long parameter list and Single Responsibility Principle; a connection between message chain and Least Knowledge; and a connection between unused method and Minimize Upfront Design.

7. The method for evaluating code design quality of claim 1, wherein the evaluating of the design quality of the code based on the prediction result comprises at least one of:
evaluating the design quality of the code based on whether it violates a design principle, wherein not violating the design principle is relatively better in the design quality than violating the design principle; and
evaluating the design quality of the code based on the quantified degree to which the design principle is violated, wherein the quantified degree to which the design principle is violated is inversely proportional to how good the design quality is evaluated to be.

8. A non-transitory computer-readable storage medium, storing computer-readable instructions, the computer-readable instructions being usable to cause at least one processor to, when executed, carry out the method for evaluating code design quality of claim 1.

9. The method for evaluating code design quality of claim 1, further comprising:
outputting one or more of the design principles having the highest values of the quantified degree.

10. The method for evaluating code design quality of claim 1, wherein the modification record of the code includes a history of one or more of additions, deletions, changes, or revisions of the code.

11. An apparatus for evaluating code design quality, comprising:
a determining module configured to determine probabilities of error-prone patterns in a code based on a compound logic conditional expression including at least one of a result of a static scanning and a modification record of the code, determining the probabilities of error-prone patterns in the code includes at least one of,
determining a probability of an existence of a shotgun surgery based on a compound logic conditional expression including metrics of afferent coupling, efferent coupling and changing method,
determining a probability of an existence of a divergent change based on a compound logic conditional expression including metrics of revision number, instability and afferent coupling,
determining a probability of an existence of a big design up front based on a compound logic conditional expression including metrics of line of code, line of changed code, class number, changed class number and a statistical average of the metrics,
determining a probability of an existence of a scattered/redundant functionality based on a compound logic conditional expression including metrics of structure similarity and logic similarity,
determining a probability of an existence of a long method based on a compound logic conditional expression including a metric of cyclomatic complexity,
determining a probability of an existence of a complex class based on a compound logic conditional expression including metrics of line of code, attribute number, method number and maximum method cyclomatic complexity,
determining a probability of an existence of a long parameter list based on a compound logic conditional expression including a metric of parameter number, or
determining a probability of an existence of a message chain based on a compound logic conditional expression including a metric of indirect calling number;
a prediction result determining module configured to input the probabilities of each of the error-prone patterns into an artificial neural network and, based on the artificial neural network, connect the probabilities of each of the error-prone patterns to design principles, determine a prediction result of whether the code violates the design principles, and determine a quantified degree to which the code violates the design principles; and
an evaluation module configured to evaluate the design quality of the code based on the prediction result.

12. A system for evaluating code design quality, comprising:
a code repository, configured to store a code to be evaluated and a modification record of the code;
a static scanning tool, configured to statically scan the code to be evaluated;
an error prone pattern detector, configured to determine a probability of an error-prone pattern in the code based on a compound logic conditional expression including at least one of a result of the static scanning and the modification record, determining the probabilities of error-prone patterns in the code includes at least one of,
determining a probability of an existence of a shotgun surgery based on a compound logic conditional expression including metrics of afferent coupling, efferent coupling and changing method,
determining a probability of an existence of a divergent change based on a compound logic conditional expression including metrics of revision number, instability and afferent coupling,
determining a probability of an existence of a big design up front based on a compound logic conditional expression including metrics of line of code, line of changed code, class number, changed class number and a statistical average of the metrics, determining a probability of an existence of a scattered/redundant functionality based on a compound logic conditional expression including metrics of structure similarity and logic similarity, determining a probability of an existence of a long method based on a compound logic conditional expression including a metric of cyclomatic complexity, determining a probability of an existence of a complex class based on a compound logic conditional expression including metrics of line of code, attribute number, method number and maximum method cyclomatic complexity, determining a probability of an existence of a long parameter list based on a compound logic conditional expression including a metric of parameter number, or determining a probability of an existence of a message chain based on a compound logic conditional expression including a metric of indirect calling number; and an artificial neural network, configured to determine, based on the probability of each of the error-prone patterns and a connection between the probabilities of each of the error-prone patterns to design principles, a prediction result of whether the code violates the design principles and a quantified degree to which the code violates the design principles, wherein the prediction result is used to evaluate the design quality of the code.

13. An apparatus for evaluating code design quality, comprising:

a processor; and a memory, wherein the memory stores an application, executable by the processor, to cause the processor to execute, for evaluating code design quality, at least:

determining probabilities of error-prone patterns in a code based on a compound logic conditional expression including at least one of a result of static scanning of the code and a modification record of the code, including at least one of, determining a probability of an existence of a shotgun surgery based on a compound logic conditional expression including metrics of afferent coupling, efferent coupling and changing method, determining a probability of an existence of a divergent change based on a compound logic conditional expression including metrics of revision number, instability and afferent coupling, determining a probability of an existence of a big design up front based on a compound logic conditional expression including metrics of line of code, line of changed code, class number, changed class number and a statistical average of the metrics, determining a probability of an existence of a scattered/redundant functionality based on a compound logic conditional expression including metrics of structure similarity and logic similarity, determining a probability of an existence of a long method based on a compound logic conditional expression including a metric of cyclomatic complexity, determining a probability of an existence of a complex class based on a compound logic conditional expression including metrics of line of code, attribute number, method number and maximum method cyclomatic complexity, determining a probability of an existence of a long parameter list based on a compound logic conditional expression including a metric of parameter number, or determining a probability of an existence of a message chain based on a compound logic conditional expression including a metric of indirect calling number;

inputting the probabilities of each of the error-prone patterns into an artificial neural network, and, based on the artificial neural network, connect the probabilities of each of the error-prone patterns to design principles, determining a prediction result of whether the code violates the design principles, and determine a quantified degree to which the code violates the design principles; and evaluating the design quality of the code based on the prediction result.

* * * * *